United States Patent
Moon et al.

(10) Patent No.: US 11,652,199 B2
(45) Date of Patent: May 16, 2023

(54) ULTRATHIN FOIL TRANSFERRING AND PROCESSING METHOD CAPABLE OF REDUCING CURLING OF ULTRATHIN FOIL AND PREVENTING FOLDING THEREOF

(71) Applicant: LG Chem, Ltd., Seoul (KR)

(72) Inventors: Jae Won Moon, Daejeon (KR); Hyung Seok Han, Daejeon (KR); Hyung Kyun Yu, Daejeon (KR); Ki Hoon Paeng, Daejeon (KR)

(73) Assignee: LG Energy Solution, Ltd.

( * ) Notice: Subject to any disclaimer, the term of this patent is extended or adjusted under 35 U.S.C. 154(b) by 289 days.

(21) Appl. No.: 17/047,540

(22) PCT Filed: Oct. 1, 2019

(86) PCT No.: PCT/KR2019/012839
§ 371 (c)(1),
(2) Date: Oct. 14, 2020

(87) PCT Pub. No.: WO2020/080710
PCT Pub. Date: Apr. 23, 2020

(65) Prior Publication Data
US 2021/0151738 A1    May 20, 2021

(30) Foreign Application Priority Data
Oct. 16, 2018  (KR) .................. 10-2018-0123011

(51) Int. Cl.
*H01M 4/04* (2006.01)
*H01M 4/66* (2006.01)
(Continued)

(52) U.S. Cl.
CPC ............. *H01M 4/0435* (2013.01); *B05C 1/08* (2013.01); *H01M 4/66* (2013.01); *H01M 4/70* (2013.01); *H01M 10/0587* (2013.01)

(58) Field of Classification Search
CPC .......... H01M 4/04; H01M 4/12; H01M 4/043; H01M 4/16; H01M 10/0587; B05C 1/08
See application file for complete search history.

(56) References Cited

U.S. PATENT DOCUMENTS

2007/0015060 A1 *  1/2007  Klaassen ............. H01M 10/056
                                                              429/126
2015/0303485 A1    10/2015  Kim et al.

FOREIGN PATENT DOCUMENTS

DE    2546706 A1    4/1976
EP    3046160 A1    7/2016
(Continued)

OTHER PUBLICATIONS

Extended European Search Report including Written Opinion for Application No. 19874527.5 dated Jul. 8, 2021, pp. 1-8.
(Continued)

*Primary Examiner* — Kenneth J Douyette
(74) *Attorney, Agent, or Firm* — Lerner David LLP

(57) ABSTRACT

The present invention relates to an ultrathin foil transferring and processing process for reducing curling and preventing folding of an ultrathin foil which may occur in the ultrathin foil transferring and processing process, and comprises: a step of coating or mounting an electrostatic-inducing material on both ends of a roll to form a charging part; a charging step of rubbing an ultrathin foil and the roll during the transferring and rolling of the ultrathin foil, to charge both ends of the ultrathin foil and the roll with positive or negative charges; and an electrostatic force applying step in which an electrostatic force is applied to both ends of the ultrathin foil simultaneously with or after the charging step and thus the curling of the ultrathin foil is reduced.

18 Claims, 4 Drawing Sheets

(51) Int. Cl.
 *H01M 4/70* (2006.01)
 *H01M 10/0567* (2010.01)
 *B05C 1/08* (2006.01)
 *H01M 10/0587* (2010.01)

(56) References Cited

FOREIGN PATENT DOCUMENTS

| | | |
|---|---|---|
| JP | 2000010421 A | 1/2000 |
| JP | 2004047372 A | 2/2004 |
| JP | 2017183025 A | 10/2017 |
| JP | 2018056573 A | 4/2018 |
| KR | 20060134351 A | 12/2006 |
| KR | 20080042967 A | 5/2008 |
| KR | 101040704 B1 | 6/2011 |
| KR | 20150031035 A | 3/2015 |
| KR | 20150037687 A | 4/2015 |
| KR | 20150127008 A | 11/2015 |
| KR | 20160035422 A | 3/2016 |
| KR | 20170048804 A | 5/2017 |
| WO | 2013128793 A1 | 9/2013 |

OTHER PUBLICATIONS

International Search Report for Application No. PCT/KR2019/012839 dated Jan. 14, 2020, 2 pages.

\* cited by examiner

【Fig. 1】
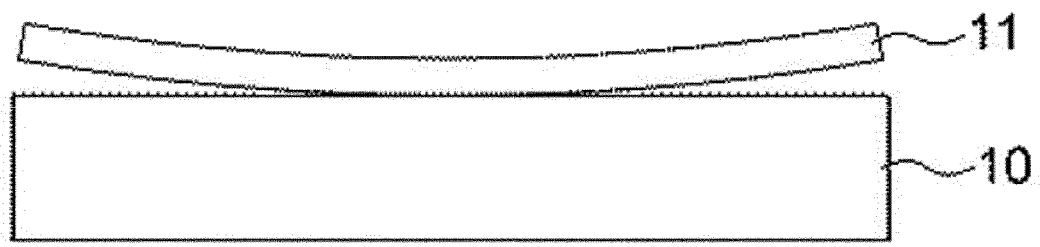
【Fig. 2】
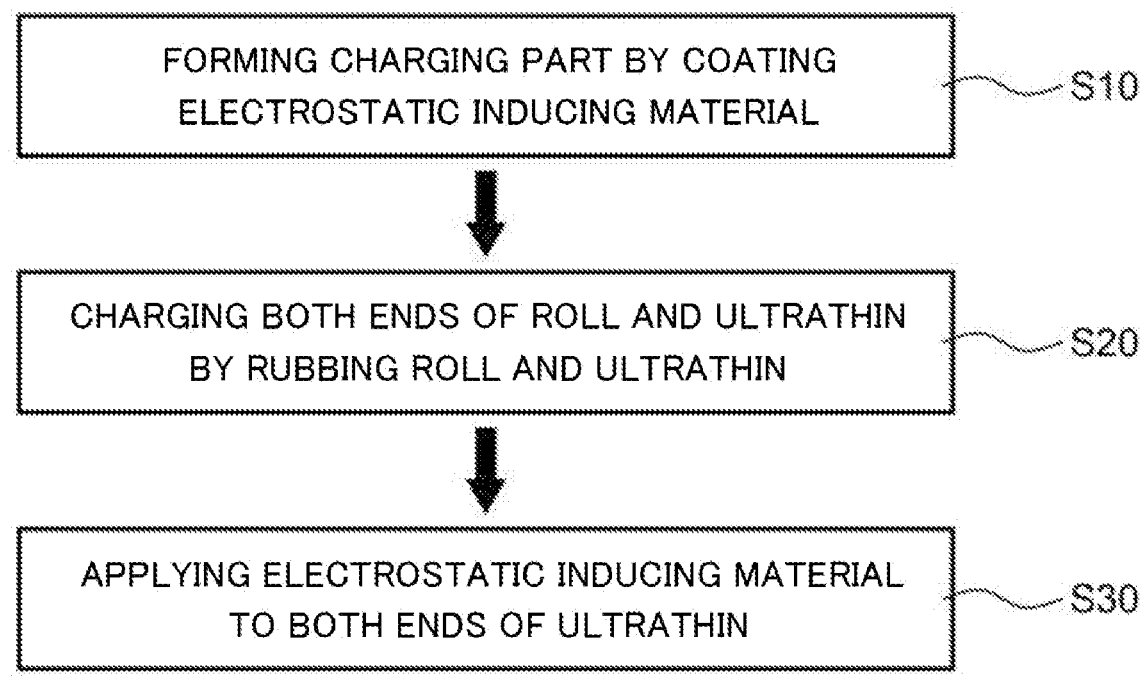

【Fig. 3】
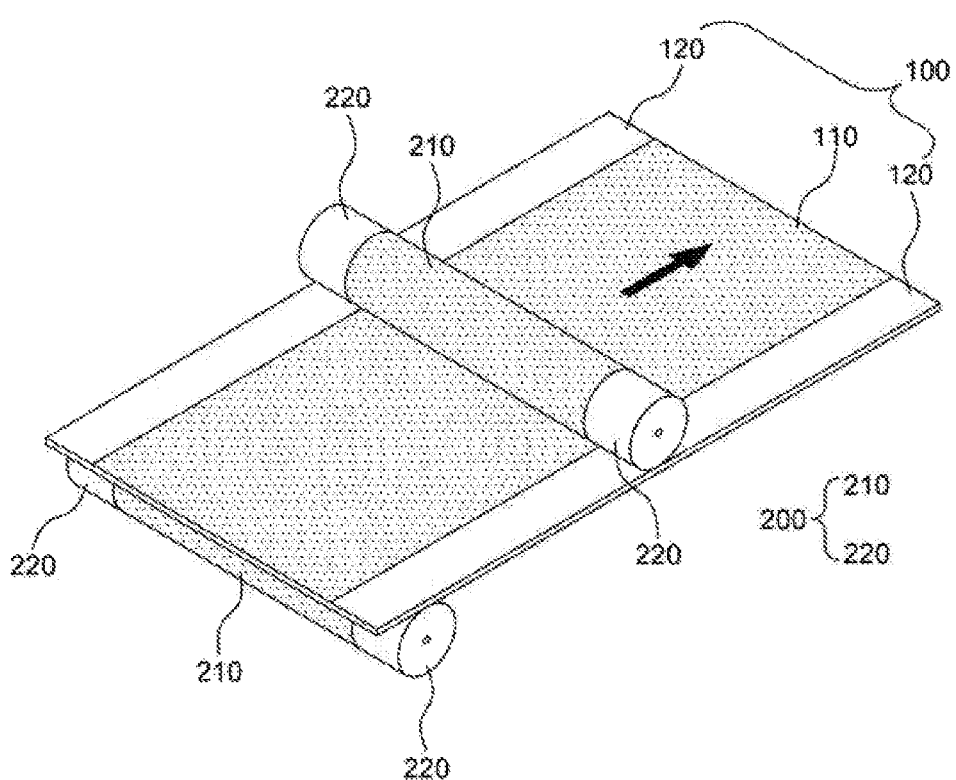
【Fig. 4】
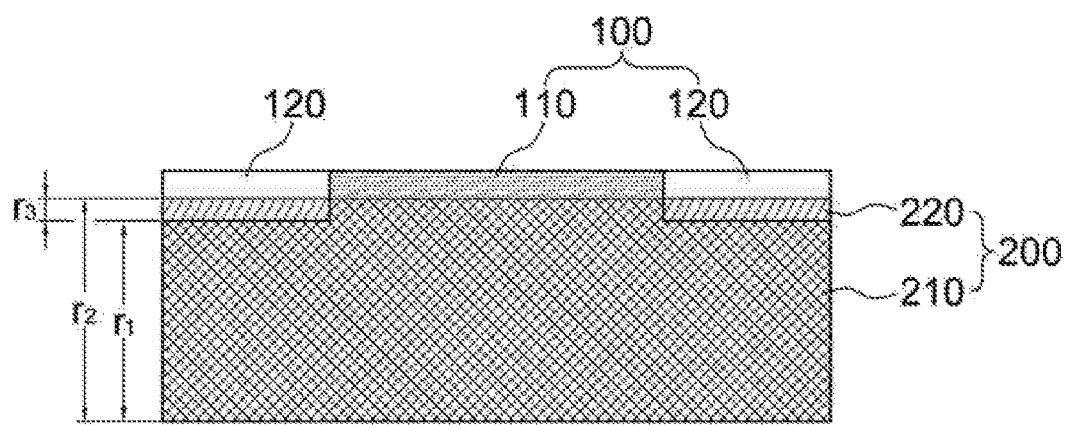

[Fig. 5]
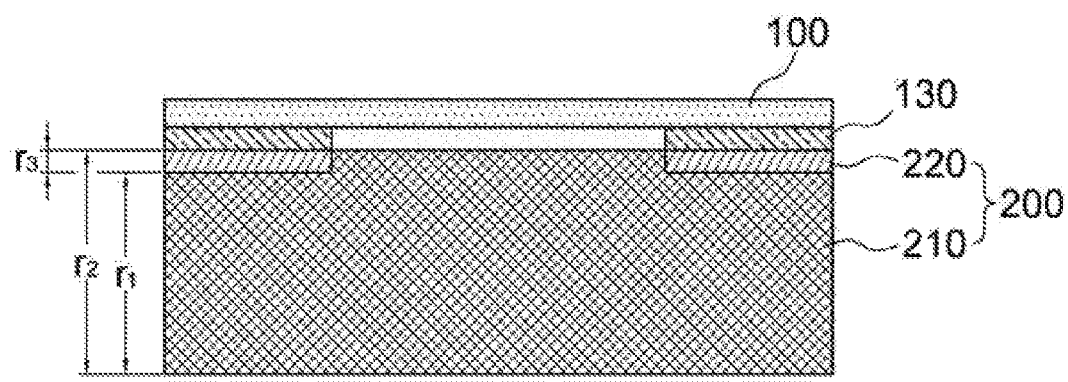
[Fig. 6]
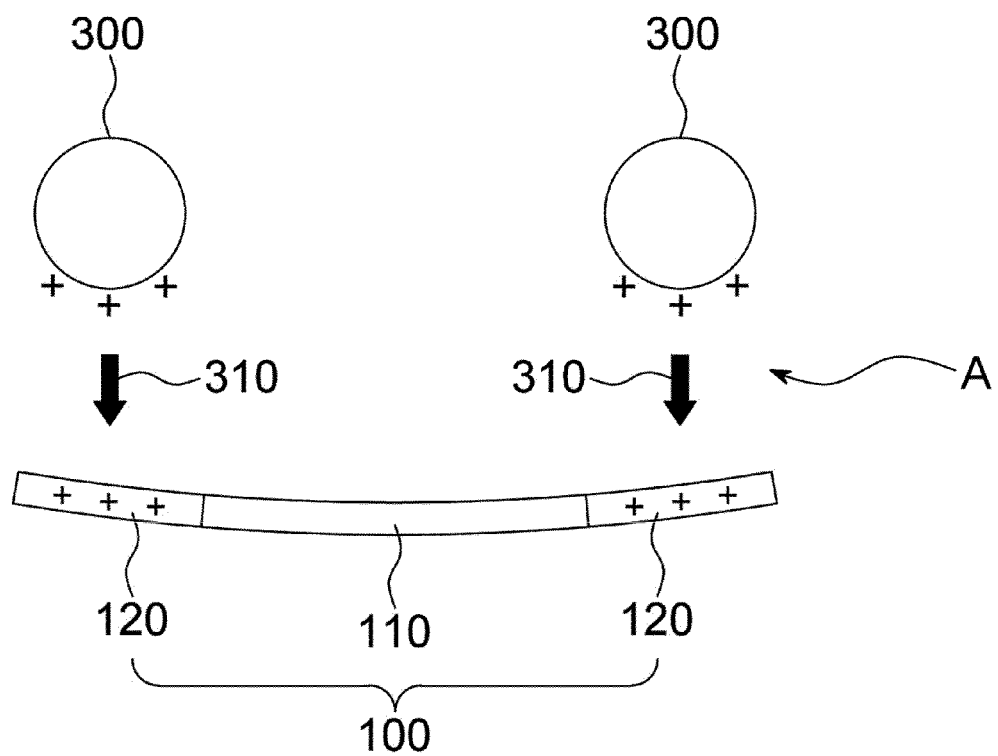

[Fig. 7]
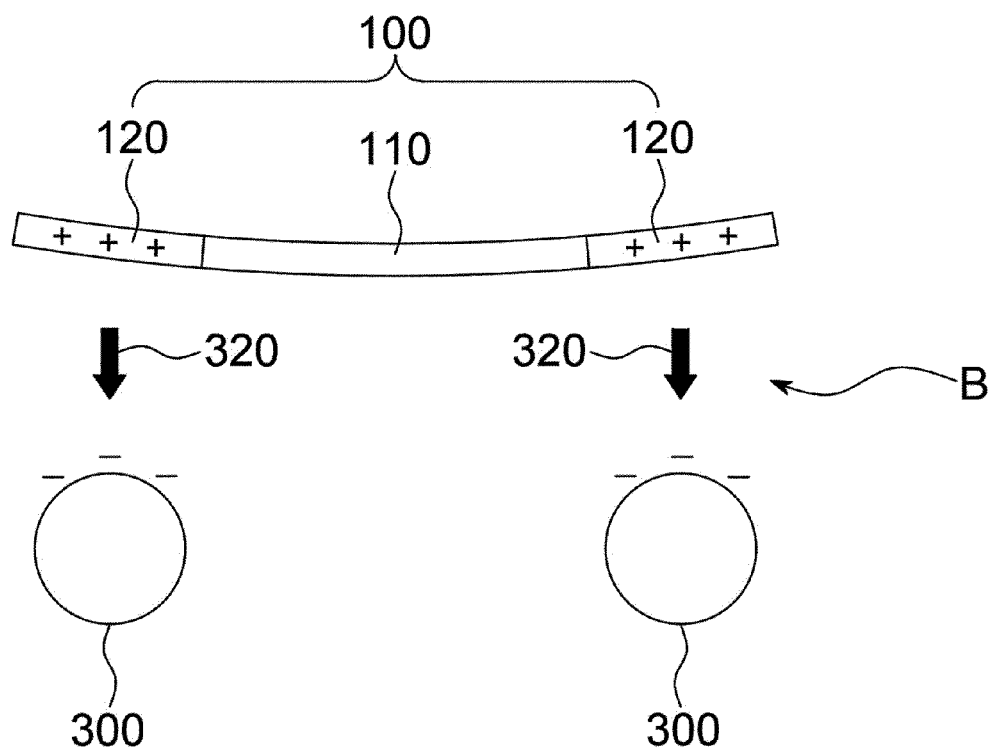
[Fig. 8]
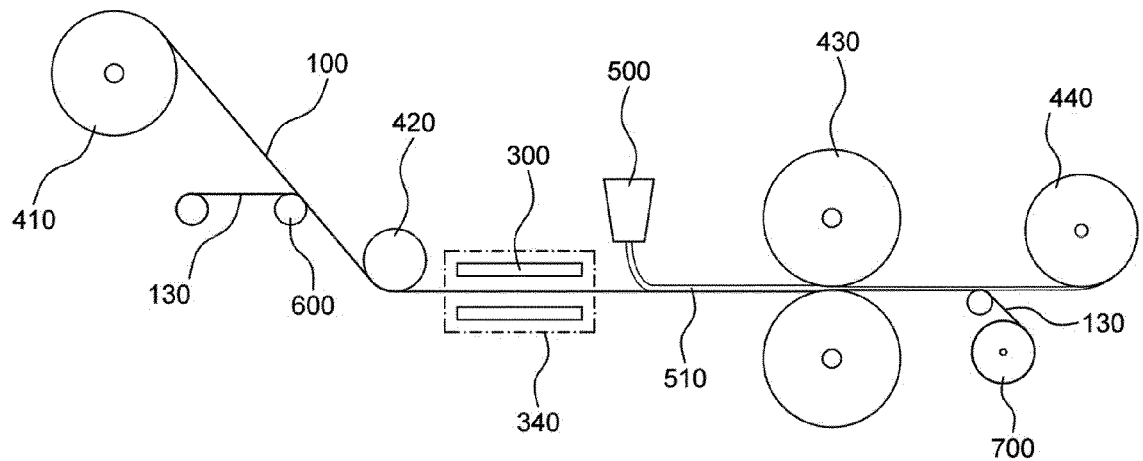

ULTRATHIN FOIL TRANSFERRING AND PROCESSING METHOD CAPABLE OF REDUCING CURLING OF ULTRATHIN FOIL AND PREVENTING FOLDING THEREOF

CROSS-REFERENCE TO RELATED APPLICATIONS

The present application is a national phase entry under 35 U.S.C. § 371 of International Application No. PCT/KR2019/012839, filed on Oct. 1, 2019, which claims priority to Korean Patent Application No. 10-2018-0123011, filed on Oct. 16, 2018, the disclosures of which are incorporated herein by reference in their entirety.

TECHNICAL FIELD

The present invention relates to an ultrathin transferring and processing method used for a secondary battery by a roll-to-roll process, and is a method for preventing a folding phenomenon due to an ultrathin bending during a process.

BACKGROUND ART

Recent trends in the electronics industry can be summarized as device and wireless, mobile trends and the shift from analog to digital. Representative examples include the rapid spread of wireless phones (mobile phones) and notebook computers, as well as the shift from analog cameras to digital cameras.

In addition to these trends, research and development on secondary batteries as an operating power source for devices have been actively conducted. In particular, lithium secondary batteries having high output and capacity to weight, which use lithium transition metal oxides and lithium composite oxides as positive electrode active materials, have been widely spotlighted.

Secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

In general, the negative electrode has a structure in which a carbon-based active material is coated on an electrode plate made of copper or aluminum, and the positive electrode has a structure in which an active material made of $LiCoO_2$, $LiMnO_2$, $LiNiO_2$, or the like is coated on an electrode plate made of aluminum, etc.

In order to manufacture a positive electrode or a negative electrode, an electrode mixture including an electrode active material is coated on an electrode current collector made of a long metal sheet in one direction.

The separator is positioned between the positive electrode and the negative electrode of the battery to perform insulation and maintain the electrolyte to provide a passage for ion conduction.

The roll press process, the slitting process, the notching process, the lamination process, or the folding process for manufacturing the electrode and the separator and the like are mostly performed by a roll-to-roll process. Herein, the roll-to-roll process refers to a process in which a plurality of bendable metal foils and the like move between rollers and perform a process such as coating and printing.

That is, for example, by unwinding the roll winding the flexible, a thin sheet-like material, materials are supplied, the supplied materials are coated and printed, and then materials processed from another roll are rewound and retrieved.

However, in the prior art, in the process of transferring and processing an ultrathin such as a current collector, a phenomenon in which the ultrathin is curved due to a gap between the roll and the roll and a difference in tension applied to the center and the edge of the electrode sheet occurs.

If the bending phenomenon becomes severe, the electrode sheet may be folded in a subsequent transfer process or rolling process. If the above problem occurs during the electrode manufacturing process, the subsequent process such as forming an electrode tab may be impossible.

On the other hand, as a method for solving the above problems, in U.S. Pat. No. 1,764,578, disclosed is an electrode sheet unwinding apparatus including a touch roll for inducing unwinding of an electrode sheet in a state of being in contact with an outer surface of an electrode roll on which an electrode sheet is wound to take out an electrode sheet in order to prevent the folding of the electrode sheet. However, in the apparatus, when the sheet drawn out of the electrode roll and the touch roll is subjected to a subsequent transferring or rolling process, there is still a possibility that the phenomenon of bending of the sheet occurs.

Therefore, there is a need for developing an ultrathin feed and processing method to solve the above problems.

DISCLOSURE

Technical Problem

It is an object of the present invention to solve the above-mentioned problems of the prior art and the technical problems required from the past.

In the roll-to-roll process of the present invention, during ultrathin transfer and processing, both ends of the roll are coated with an electrostatic inducing material, and by applying an electrostatic attraction caused by friction during the transfer process, the bending phenomenon occurring at the edge of the ultrathin is alleviated, and the ultrathin folding that may occur when the bending is severe is prevented. This can significantly reduce the defective rate of the battery in subsequent steps and improve the safety of the battery.

Technical Solution

Therefore, in order to achieve the above purpose, a method for transferring and processing a ultrathin, in a roll-to-roll process, according to the present invention may include: coating or mounting an electrostatic inducing material on both ends of a roll to form a charging part; charging both ends of the ultrathin and the roll to a positive or negative charge by rubbing the ultrathin and the roll during the ultrathin transferring and rolling process; and applying an electrostatic force to both ends of the ultrathin at the same time as or after the charging to thereby alleviate a bending phenomenon of the ultrathin.

According to an embodiment of the present invention, the ultrathin and the roll are preferably charged with charges of different polarities.

According to an embodiment of the present invention, the width of the charging part may be 5% to 25% of the total width of the roll.

According to an embodiment of the present invention, the ultrathin may be one selected from the group consisting of non-conductors allowing production of a fabric, such as polyethylene, polypropylene, polyolefin, polyester, nylon, cotton, acrylic fiber, polyurethane, and the like, or one selected from the group consisting of conductors allowing production in a ultrathin form, such as copper, aluminum, nickel, titanium, tungsten, iron, silver, gold and an alloy containing the materials.

According to an embodiment of the present invention, the ultrathin may be an electrode current collector, film or sheet used in secondary batteries.

According to an embodiment of the present invention, when the ultrathin is a conductor, the charging may further include attaching a nonconductive tape including a nonconductive film and an adhesive applied thereto to a surface in contact with the charging part in the ultrathin.

According to an embodiment of the present invention, in the attached nonconductive tape, the thickness of the nonconductive film may be 50 to 300 μm, and the width thereof corresponds to the width of the charging part.

According to an embodiment of the present invention, the electrostatic inducing material may be one selected from the group consisting of ebonite, nylon, wool, rayon, silk, acetate, orlon cotton blend, pulp noji, rubber, terylene, vinylon, sarin, polyclone, caffeate, polyethylene, canecalone, celluloid, cellophane, vinyl chloride, and teflon.

According to an embodiment of the present invention, an electrostatic inducing material and a material the ultrathin coated or mounted on the charging part may be different.

According to an embodiment of the present invention, the nonconductive tape attached to the ultrathin and the electrostatic inducing material coated or mounted on the charging part may be different from each other.

Further, the thickness of the electrostatic inducing material to be coated may be 1 to 20 mm.

According to an embodiment of the present invention, the diameter of a portion in which the charging part is formed in the roll may be formed to be smaller than the diameter of the portion in which the charging part is not formed, by the thickness of the portion to be coated.

According to an embodiment of the present invention, the applying of the electrostatic force may include applying the electrostatic force in an opposite direction of the curvature by installing an object charged with the opposite polarity or the same polarity as that of the both ends, on one or both sides of the charged both ends of the ultrathin.

According to an embodiment of the present invention, the object may be a separate charged body installed to be adjacent to the ultrathin in a state that both ends are spaced apart from the charged roll or ultrathin.

According to an embodiment of the present invention, one or more of the charged body may be installed along the direction of movement of the ultrathin.

According to an embodiment of the present invention, the charged body may be at least one selected from the group consisting of ferromagnetic or semi-ferromagnetic material containing iron or nickel.

Further, the present invention provides a secondary battery having two or more of electrodes for secondary batteries manufactured according to the present invention and having an electrode assembly built in a battery case, wherein the electrode assembly is wound with the separator which is manufactured according to the present invention and is interposed between unit electrodes.

Advantageous Effects

According to the ultrathin transferring and processing method according to the present invention, in the roll-to-roll process, by charging both ends of the roll, both ends of the ultrathin are charged due to friction between the roll and the ultrathin, and electrostatic force is applied to both ends of the ultrathin to improve the ultrathin bending phenomenon that may occur during the transfer process, to thereby ultimately prevent the foling phenomenon of the ultrathin.

BRIEF DESCRIPTION OF THE DRAWINGS

FIG. 1 is a schematic diagram showing a state in which a bending phenomenon of a ultrathin occurs in a conventional roll-to-roll process.

FIG. 2 is a flowchart showing a method of manufacturing and processing a ultrathin according to the present invention.

FIG. 3 is a schematic diagram showing the charging process of the roll and ultrathin according to the present invention.

FIG. 4 is a vertical cross-sectional view showing a state in which the roll and the ultrathin are charged with electricity in the transferring process of the ultrathin according to an embodiment of the present invention.

FIG. 5 is a vertical cross-sectional view showing a state in which the roll and the ultrathin are charged with electricity in the transferring process of the ultrathin according to another embodiment of the present invention.

FIG. 6 is a vertical cross-sectional view showing that a charged body is approached to an ultrathin, of which both ends are charged, to thereby apply electrostatic attraction force.

FIG. 7 is a vertical cross-sectional view showing that a charged body is approached to an ultrathin, of which both ends are charged, to thereby apply electrostatic repulsion force.

FIG. 8 is a schematic view showing a manufacturing process of an electrode as an embodiment according to the manufacturing and processing method of a ultrathin of the present invention.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when a part is "connected" to another part, this includes not only "directly connected" but also "electrically connected" between the parts while having another element therebetween.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Hereinafter, the present invention will be described in detail.

FIG. 1 is a schematic diagram showing a state in which a bending phenomenon of a ultrathin occurs in a conventional roll-to-roll process. The roll-to-roll process is a process which can perform processes such as coating and printing while moving various ultrathins, such as several flexible foils, between a roll and a roll. Referring to FIG. 1, a ultrathin 11 is transferred onto a roll 10 that transfers a ultrathin. In the transfer process, the center portion of the ultrathin 11 is in contact with the roll 10 due to the gap between the roll 10 and the roll 10 and the difference in tension between the center and the edge of the ultrathin 11, but a curvature phenomenon, in which both ends of the ultrathin 11 are spaced apart from the roll 10, occurs. When the bending phenomenon is intensified, a phenomenon in which both ends of the ultrathin 11 spaced apart from the roll 10 are folded in a subsequent rolling process or the like may occur.

Accordingly, the present invention discloses a method of applying an electrostatic force to both ends of the ultrathin and a secondary battery manufactured by the above method in order to solve the above problems.

FIG. 2 is a flowchart showing a method of manufacturing and processing a ultrathin according to the present invention, and FIG. 3 is a schematic diagram showing the charging process of the roll and ultrathin according to the present invention.

Referring to FIGS. 2 and 3, a ultrathin transferring and processing method according to the present invention includes: a step of forming a charging part 220 by coating an electrostatic inducing material on both ends of a roll 200 (S10); a step of charging both ends of the ultrathin 100 and the roll 200 to positive or negative charge by rubbing the ultrathin 100 and the roll 200 during the transfer and rolling of the ultrathin 100 (S20); and a step of applying an electrostatic force to both ends 120 of the ultrathin 100 to relieve the bending phenomenon of the ultrathin 100 (S30).

In the step of forming the charging part 220 (S10), the electrostatic inducing material is coated or mounted at both ends of the roll 200. In general, since the roll used in the roll-to-roll process is made of a conductive material such as a metal, the amount of charge of the conductor is the same in any part due to free electrons in the metal and static electricity is not easily generated. Therefore, by coating or mounting a material capable of generating static electricity at both ends of the roll 200, the both ends of the roll 200, which cannot generate static electricity, may be charged. Here, coating the electrostatic inducing material on both ends of the roll 200 means that the outer circumferential surfaces of both ends of the roll 200 are coated with the electrostatic inducing material. In addition, the electrostatic inducing material may be mounted on both side portions of the roll, and the electrostatic inducing material is preferably in the form of a cylindrical block in accordance with the shape of the roll. In this case, the electrostatic inducing material and the roll of the cylindrical block may be fixedly mounted at both ends of the roll by mechanical or chemical methods.

When the electrostatic inducing material is coated or mounted on both ends of the roll 200 to form the charging part 220, the transfer and processing of the ultrathin 100 is performed, and in this process, friction occurs between the roll 200 and the ultrathin 100, so that both ends 120 of the ultrathin 100 corresponding to the charging part 220 of the roll 200 are charged with opposite polarities to the charging part 220 (S20).

In general, every object consists of an atomic nucleus and an electron, and in order to remain neutral, the numbers of electrons and nuclei should be equal. However, when two materials come in contact, electrons (especially electrons in orbits farthest from the nucleus) move freely, and one material gets electrons and is charged with a negative charge, while the other material loses electrons and is charged with a positive charge. At this time, the stronger the contact pressure is and the higher the peeling rate (contact speed) is, the larger the charge amount becomes.

The charging phenomenon includes contact charging, frictional charging, peeling charging and the like.

Contact charging occurs when two different objects come into contact and are separated. When different objects come in contact with each other, charge transfer occurs in each object to form an electric double layer, and then static electricity is generated by charge separation. In addition, even in the same kind of objects, contact charging may occur depending on the surface condition such as corrosion and smoothness. Friction charging refers to a phenomenon in which static electricity is generated when an object causes a friction or when a contact is moved by friction, causing charge separation. Peeling charging refers to a phenomenon in which charge separation occurs and static electricity is generated when objects close to each other are separated.

That is, since the charging part 220 is coated or mounted with electrostatic inducing materials, the charging part 220 of the roll 200 and both ends 120 of the ultrathin 100 are repeatedly contacted, rubbed, and separated as the ultrathin is transported. As such, the charging part 220 of the roll 200 and both ends 120 of the ultrathin 100 are charged with electric charges having different polarities.

The width of the charging part 220 is preferably 5 to 25% of the entire width of the roll 200. More specifically, in the case of the ultrathin 100 having a width of 1000 mm or less depending on the width of the ultrathin 100, it is preferable that an area of 10 to 25% of the entire width of the roll 200 is coated with an electrostatic inducing material, or an electrostatic inducing material having a thickness corresponding to the above range is mounted thereon. In the case of the ultrathin 100 having a width exceeding 1000 mm, it is preferable that 5 to 10% of the area of the roll 200 is coated or mounted with an electrostatic material. When the width of the charging part 220 is less than 5% of the total width of the roll 200, the area where the electrostatic force acts on the ultrathin 100 is not enough to achieve the desired effect, and when the width of the charging part 220 exceeds 25% of the overall width of the roll 200, the range of force acting on the ultrathin 100 is increased, thereby allowing the force to be applied to the unintended portion, and the original purpose of improving curvature cannot be achieved.

In addition, when the electrostatic inducing material is coated on the charging part 220, the thickness of the electrostatic inducing material is preferably 1 mm to 20 mm, more preferably 5 mm to 10 mm, in view of the mechanical stability of the electrostatic inducing material. If the thickness of the electrostatic material is less than 1 mm, there is a possibility that the charging part 220 is easily worn during the transfer process of the ultrathin 100, and if the thickness exceeds 20 mm, a step may be generated on the surface of the roll 200 and wrinkles may be generated in the ultrathin 100.

The electrostatic inducing material may be subjected to an adhesive treatment or a sand mat treatment. Herein, the adhesive treatment is a treatment for improving the adhesion of the surface, and may include a chemical treatment using physical treatment such as plasma treatment, corona discharge treatment, etc. or a chemical adhesion which is performed by using a silane coupling agent, a primer agent, etc. A sand batting process is a method of forming irregularities on the surface by spraying powdery bodies on the surface, to thereby be attached.

The electrostatic inducing material is not limited to the material if it can induce charging, may be one selected from the group consisting of ebonite, nylon, wool, rayon, silk, acetate, orlon cotton blend, pulp noji, rubber, terylene, vinylon, sarin, polyclonal, terylene, caffeine, polyethylene, canecalone, celluloid, cellophane, vinyl chloride, and teflon.

The electrostatic inducing material is a non-conductor, and the type of electrostatic inducing material to be coated or mounted on the charging part 220 is not limited if it has the required mechanical strength, but is preferably different from the material of the ultrathin 100. Further, when compared with the following charging sequence, the material of the polarity direction opposite to the material of the ultrathin 100 (or the material of the nonconductive tape 130 to be mentioned later) is more preferable. Herein, the material having the opposite polarity direction means a material having a sequence farthest from a material constituting the ultrathin 100 in the charging sequence. In addition, preferably only one type of material is used as the electrostatic inducing material throughout the entire process, because when using a variety of electrostatic materials, the magnitude of the electrostatic force applied may vary depending on the material of the ultrathin 100.

The charging sequence is formed by placing a material that is easily charged with a positive charge on top and a material that is easily charged with a negative charge on the bottom when the material is contacted or rubbed. The charging sequence of the representative high molecular material is as follows.

[−]-glass-hair-nylon-wool-rayon-silk-vinylone blend-silk-acetate-orlon cotton blend-pulp noji-rubber-terylene-vinylon-sarin-polyclone-terylene-carboxylate-polyethylene-canecalon-celluloid-cellophane-vinyl chloride-silicon-teflon-[+]

All of the above materials are insulators, and the movement of electrons within the insulator is restricted, which is why grounding is impossible. Even in one insulator, some of the electrons are lacking, while other portions of the insulator have a lot of electrons, so that the state of charge may be different.

As shown in the charging sequence, when glass and rubber are rubbed, the glass is charged with a positive charge and the rubber is charged with a negative charge. The polarity charged in this manner varies according to the friction material, and when a material above is rubbed with a material below the charging sequence, the material above the sequence is positively charged and the material below is negatively charged.

As described above, the electrostatic inducing material is preferably a material of the opposite polarity direction to the material of the ultrathin 100 (or the material of the nonconductive tape 130 attached to the conductive ultrathin 100 to be described later) when compared in the charging sequence. This is because the amount of charge is relatively low when friction between materials located close to each other in the charging sequence occurs, and thus it is impossible to apply sufficient electrostatic force to improve the bending phenomenon of the ultrathin 100.

Next, the process of charging the ultrathin 100 will be described in more detail with reference to the drawings.

FIG. 4 is a vertical cross-sectional view showing a state in which the roll and the ultrathin are charged with electricity in the transferring process of the ultrathin according to an embodiment of the present invention, and FIG. 5 is a vertical cross-sectional view showing a state in which the roll and the ultrathin are charged with electricity in the transferring process of the ultrathin according to another embodiment of the present invention.

In the present invention, the ultrathin 100 may be an electrode current collector or a separator used in the secondary battery or a film or a sheet that can be used in a secondary battery or a manufacturing process of the secondary battery. The ultrathin 100 may be an insulator or a conductor. When the ultrathin 100 is a non-conductor, the ultrathin 100 may be one selected from the group including nonconductive fabrics such as polyethylene, polypropylene, polyolefin, polyester, nylon, cotton, acrylic fiber, polyurethane, etc. When the ultrathin 100 is a conductor, the ultrathin 100 may be one selected from the group including a conductor that can be manufactured in an ultrathin form such as copper, aluminum, nickel, titanium, tungsten, iron, silver, gold, and an alloy containing the material.

Referring to FIG. 4, electrostatic inducing materials are coated or mounted at both ends 220 of the roll, and the material of the ultrathin 100 is a non-conductor. Further, as described above, the electrostatic inducing material of the charging part 220 and the material of the ultrathin 100 are different from each other, and the material of the opposite polarity direction is preferable in the charging sequence. Both ends 120 of the ultrathin 100 are charged with charges of the polarity opposite to that of the charging part 220 due to the friction of the charging part 220 (in the drawing, the charging part 220 is charged with a negative charge, and both ends 120 of the ultrathin 100 are shown as being positively charged). In addition, a step may be formed on the surface of the roll 200 due to the thickness of the electrostatic inducing material coated on the charging part 220. When such a step is formed, in the process where the ultrathin 100 is transferred or rolled, wrinkles are generated in the ultrathin 100, and if severe, there is a risk that the ultrathin 100 is damaged. Therefore, the diameter $r_1$ of the portion in which the charging part 220 is formed in the roll 200 is preferably smaller than the diameter $r_2$ of the portion 210, in which the charging part is not formed, by the thickness $r_3$ of the portion to be coated in order not to form a step on the surface of the roll 200. In addition, FIG. 4 shows only the appearance that the electrostatic inducing material is coated on both ends of the roll, but in FIG. 4, instead of the electrostatic inducing material being coated, cylindrical electrostatic inducing materials having a thickness corresponding to the charging part 220 may be mounted on both sides of the roll.

FIG. 5 is a diagram illustrating a case where the material of the ultrathin 100 is a conductor. Referring to FIG. 5, as in FIG. 4, the diameter $r'_1$ of the portion in which the charging part 220 is formed in the roll 200 is smaller than the diameter $r'_2$ of the portion 210, in which the charging part is not formed, by the thickness $r'_3$ of the coated portion. As in FIG. 4, instead of the coating of the electrostatic inducing material in FIG. 5, cylindrical electrostatic inducing materials having a thickness corresponding to the charging part 220 may be mounted on both sides of the roll.

However, if the material of the ultrathin 100 is a nonconductor, both ends 120 of the ultrathin 100 may be charged through friction with the roll 200 directly, but if the material of the ultrathin 100 is a conductor as described above, the generation of static electricity is not easy due to the presence of free electrons as described above. Therefore, when the material of the ultrathin 100 is a conductor, the step of charging the ultrathin (S20) further includes attaching the nonconductive tape 130 to the surface in contact with the charging part 220 in the ultrathin 100.

In addition, the nonconductive tape 130 is composed of a nonconductive film and an adhesive applied to the nonconductive film, and the adhesive is not limited in kind, but should have an adhesive force that can prevent separation from the ultrathin 100 during the transfer process. After the process is finished, the nonconductive tape 130 should be easy to be separated from the ultrathin 100 without damaging the ultrathin 100. In addition, the adhesive should not be left on the surface of the ultrathin 100 after separation of the nonconductive tape 130 so as not to affect the ultrathin 100 or be easily removable from the ultrathin 100.

In addition, as long as the non-conductor film can be charged, there is no limit to the type, but it is preferably one selected from the group consisting of ebonite, nylon, wool, rayon, silk, acetate, orlon cotton blend, pulp noji, rubber, terylene, vinylon, sarin, polyclonal, terylene, caffeine, polyethylene, canecalone, celluloid, cellophane, vinyl chloride, and teflon. Further, it is different from the electrostatic inducing material to be coated or mounted on the charging part 220, and the material of the opposite polarity direction in the charging sequence is preferred.

The thickness of the nonconductive tape 130 may be 50 to 300 μm, more preferably 50 μm to 200 μm, in terms of adhesion, ease of separation, and damage prevention during transport. When the thickness of the nonconductive tape 130 is less than 50 μm, it is difficult to separate the nonconductive tape 130 from the ultrathin 100, and the nonconductive tape 130 may be damaged during the transfer process. When the thickness of the nonconductive tape 130 exceeds 300 μm, wrinkles may be generated in the ultrathin 100 due to a space generated by a space between the ultrathin 100 and the roll 200 by the thickness of the non-conductor itself 130, and if severe, the ultrathin 100 may be damaged. In addition, the thickness of the adhesive applied to the nonconductive tape may be 5 to 150 μm, more preferably 5 to 100 μm. If the thickness of the adhesive is less than 5 μm, the adhesive effect may not be sufficient so that the nonconductive tape 130 may be separated from the ultrathin. If the thickness of the adhesive exceeds 150 μm, the adhesive force is very strong so that it may difficult to separate the nonconductive tape 130 from the ultrathin, and the ultrathin may be damaged during the separation process.

In addition, the width of the nonconductive tape 130 preferably matches the width of the charging part 220. When the width of the nonconductive tape 130 is smaller than the width of the charging part 220, a portion of the charging part 220 may not be covered by the nonconductive film 130, and the exposed portion may contact the conductive material ultrathin 100, which is not preferable. In addition, when the width of the nonconductive tape 130 is too large, it is difficult to separate the nonconductive tape 130 from the ultrathin 100, and the charged nonconductive tape 130 may contact a portion on which the electrostatic inducing material of the roll 200 has not been coated, which is not preferable. When the charged nonconductive tape 130 or the charging part 200 and the surface of the ultrathin 100 or the roll 200 made of a conductive material directly contact, the excess electrons causing static electricity in the conductor direction are lost or insufficient electrons are compensated (when the non-conductor is charged with negative charge), so that it will become electrically neutral (when the non-conductor is positively charged).

Next, the electrostatic force application step of the present invention will be described in detail with reference to the drawings.

In the present invention, the electrostatic force applying step is a step in which electrostatic force is applied to both end portions 120 of the ultrathin 100 at the same time as or after the charging step. Here, the case that the electrostatic force is applied at the same time as the charging step refers to the situation when due to the friction between the charging part 220 and both ends 120 of the ultrathin 100, both ends 120 of the ultrathin 100 are charged and at the same time, an electrostatic force is immediately applied to the ultrathin 100 by the charging part 220.

In addition, the case where the electrostatic force is applied to both ends 120 of the ultrathin 100 after the charging step means that the electrostatic force is applied to the ultrathin 100 from the outside in the process after the charging step. The rate of dissipation of static electricity depends on several variables, but can generally be influenced by charged body surface conductivity, especially by humidity. Since the static electricity may be maintained for several minutes in an environment of 50% or less humidity, it is possible to continuously apply an electrostatic force after the ultrathin 100 is charged.

The step of applying the electrostatic force to both ends 120 of the ultrathin 100 after the charging step may be a step of applying an electrostatic force in a direction opposite to the direction in which the curvature is formed by installing an object charged with a charge of opposite polarity or the same polarity as that of both ends on one or both sides of charged both ends of the ultrathin. The object may become a separate charging body installed to be adjacent to the ultrathin in a state in which both ends are spaced apart from the charged roll and the ultrathin. When the object is a roll, it means a method of charging both ends of the roll by coating or mounting an electrostatic inducing material on both ends of the roll in contact with the ultrathin 100 after the charging step, and this is a method that can continuously charge both ends 120 of the ultrathin 100 during the process. (to be described with reference to FIG. 8)

In addition, the step of applying of the electrostatic force may be the step of applying electrostatic force in the opposite direction of the direction in which the curve is formed by installing a separate charged body 300 charged with a charge of the opposite polarity or the same polarity with that of the both ends 120 on one side or both sides of the charged both ends 120 of the ultrathin 100 (Here, the direction in which the curve is formed means a direction in which both ends 120 of the ultrathin 100 move while the ultrathin 100 is bent due to the curved phenomenon). The charged body 220 may be positioned at a portion where the ultrathin 100 is transferred between the rolls, thereby suppressing a bending phenomenon that may occur between the rolls. The method of charging the charged body 300 is not limited.

The charged body 300 may be at least one selected from the group consisting of ferromagnetic and quasi-ferromagnetic materials, and the ferromagnetic or semi-ferromagnetic materials are preferably iron or nickel, but are not limited thereto.

The charged body 300 may be disposed in parallel with the ultrathin 100 in a state spaced apart at intervals of 5 mm to 50 mm with respect to the ultrathin, and one or more may be installed in the transport direction of the ultrathin 100. When the distance between the charged body 300 and the ultrathin 100 is less than 5 mm, the charged body 300 and the ultrathin 100 may come into contact with each other, thereby causing a damage or interference to the ultrathin 100 which may lead to unexpected problems. If it exceeds 50 mm, the force acting on the ultrathin 100 is reduced, so that it is difficult to achieve the desired effect.

FIG. 6 is a vertical cross-sectional view illustrating an application of an attraction force by approaching the charged body 300 to the ultrathin 100 charged at both ends 120, and FIG. 7 is a vertical cross-sectional view showing a state in which both ends 120 apply a repulsive force by allowing the charged body 300 to approach the ultrathin 100.

FIGS. 6 and 7 show a curvature phenomenon in the ultrathin 100, and both ends 120 of the ultrathin 100 are charged with positive charges.

Referring to FIG. 6, the charged body 300 adjacent to the ultrathin 100 is charged with positive charges, and the charged body 300 is applied with an electrostatic force in a state spaced apart from one surface of the ultrathin 100 opposite to the two ends 120 of the ultrathin. In FIG. 3, the charged body 300 charged with the positive charge should apply the repulsive force 310 to the ultrathin 100 charged with the same positive charge. As such, when the ultrathin is curved, it is located on the inner side (A) of the formed curved surface to push the both ends 120 of the ultrathin. There is no particular limitation on the size, shape or cross section of the charged body 300.

Referring to FIG. 7, since the charged body 300 was charged with negative charge and in this case, the attraction force 320 should be applied to the ultrathin 100. As such, the charged body 300 is positioned on the outer side B of the curved surface formed when the ultrathin 100 is curved, to thereby pull both ends 120 of the ultrathin 100. Likewise, there is no particular limitation on the size, shape or cross section of the charged body 300.

If both ends 120 of the ultrathin 100 are negatively charged, the location of the charged body 300 or the polarity of the electric charges charged to the charged body 300 should be reversed.

FIG. 8 is a schematic view showing a manufacturing process of an electrode as an embodiment according to the transporting and processing method of a ultrathin 100 of the present invention.

Referring to FIG. 8, an electrode according to the present invention is manufactured by a roll-to-roll process, and the ultrathin 100 for the electrode current collector is wound on a feeding roll 410 for supplying the ultrathin 100 and is unwound at the feeding roll 410 and is fed to the transfer and rolling steps. Since the ultrathin 100 is made of a metal material, the nonconductive tape 130 is attached to both ends 120 by the nonconductive tape attachment device 600 at the same time of unwinding. The ultrathin 100 is transferred by one or more guide rolls 420, and during the transfer process, the electrode mixture including the electrode active material and the like are coated by the electrode active material and the electrode mixture coating device 500 including the same, thereby forming a coating layer 510. After the ultrathin 100 having the coating layer 510 is dried and rolled by the rolling roll 430, the nonconductive tape 130 is removed by the nonconductive tape removing device 700. The ultrathin 100 is then wound up by the winding roll 440. Since the nonconductive tape 130 is not coated with an adhesive only at a portion at which adhesion begins, the nonconductive tape 130 can be easily separated from the metal ultrathin 100 by removing the nonconductive tape 130 from the portion. The above method is not limited to the electrode rolling process, and it is also applicable to the processing operation performed after the completion of electrode production.

In addition, both ends of the guide roll 420, the rolling roll 430 and the like during the transfer process are coated with an electrostatic inducing material to form a charging part 220, and the charged body 300 is positioned on one or both surfaces of the ultrathin 100. The charged body may be charged with a positive charge or a negative charge, may be located only on one side of the ultrathin (not shown), or may be located on both sides of the ultrathin (340). In addition, the charged body 300 may be installed in the rolling process and the subsequent processes. Accordingly, as the electrostatic force is applied to both ends 120 of the ultrathin 100 continuously during the transfer process, the bending phenomenon of the ultrathin 100 is improved, and the folding phenomenon does not occur during rolling.

In addition, in the case of the nonmetallic ultrathin 100 such as a separator, the nonconductive tape attaching device 600 and the nonconductive tape removing device 700 are not required, and the ultrathin bending phenomenon is improved due to friction with the roll during the roll transferring process.

The present invention also provides a secondary battery produced by the method. Specifically, the secondary battery includes at least two secondary battery electrodes manufactured by the present invention and has a structure in which the electrode assembly is embedded in the battery case, wherein the electrode assembly is wound with the separator, manufactured according to the present method, interposed between the secondary battery electrodes and has a structure in which the electrode assembly is impregnated with a lithium salt-containing non-aqueous electrolyte. The electrode for the secondary battery may be a positive electrode and/or a negative electrode. In addition, the ultrathin transport and processing method according to the present invention can be applied when manufacturing the electrode assembly.

In addition, in the present invention, the secondary battery electrode may be manufactured by applying an electrode mixture containing an electrode active material on a current collector and then drying the electrode mixture. The electrode mixture may further include a binder, a conductive material, a filler, and the like, as necessary.

In the present invention, as the current collector, both ultrathin metals may be used, and an organic polymer having conductivity may be used. The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating ultrathin having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

Further, according to another example of the present invention, there is provided a battery module including the secondary battery as a unit cell and a battery pack including the same. The battery module and battery pack may be used as a power source for electric vehicles, hybrid electric vehicles, plug-in hybrid electric vehicles, and power storage systems.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

Preparation of Electrode (Example)

Copper foil having a width of 1000 mm and a thickness of 10 μm was used as the ultrathin for electrode current collectors, and 50 mm width cylindrical ebonite was processed and mounted on both ends of the roll used in the electrode manufacturing process. Further, a nonconductive tape made of Teflon for inducing charging was attached on both ends of the ultrathin, In addition, during the ultrathin conveyance, a positively charged nickel electrode was disposed on the inner surface of the curved surface formed in the ultrathin along the transferring direction. The charged body was placed at a point 20 mm away from the ultrathin.

95% by weight of carbon mixture (electrode active material), 2.5% by weight of Super-C (conductive agent) and 2.5% by weight of SBR (binder) were added to a mixed solution (solvent) of CMC (carboxymethyl cellulose, aqueous solvent) and distilled water to thereby prepare a mixture slurry. It was then applied to the ultrathin, dried, rolled and wound to prepare an electrode. The nonconductive tape was removed after rolling.

Example 2

Preparation of Separator (Example)

A coating layer having a thickness of about 0.3 μm was formed by a dip-coating method through which a polyolefin-based porous separator (Celgard™, a triple layer polyolefin-based separator) was passed through a solution in which PVDF was added at about 4 wt % to acetone as a solvent.

In this process, cylindrical ebonite having a width of 50 mm was mounted at both ends of the guide roll. In addition, during the ultrathin conveyance, a positively charged nickel electrode was disposed on the inner surface of the curved surface formed in the ultrathin along the transferring direction. The charged body was placed at a point 20 mm away from the ultrathin.

Comparative Example 1

Copper foil was used as the ultrathin, and the electrode was prepared in the same manner as in Example 1 except that the electrostatic inducing material was not mounted at both ends of the roll and the charged body was not used.

Comparative Example 2

A polyolefin porous separator was used as the ultrathin, and the electrode was prepared in the same manner as in Example 2 except that the electrostatic inducing material was not mounted at both ends of the roll and the charged body was not used.

Experimental Example 100 electrodes or separators were prepared in the same manner as described above, and the frequency of the bending phenomenon and the frequency of the ultrathin folding due to the bending phenomenon were measured. The results are shown in Table 1 below.

TABLE 1

|  | Example 1 | Example 2 | Comparative Example 1 | Comparative Example 2 |
|---|---|---|---|---|
| Curvature frequency | 100 | 100 | 100 | 100 |
| Folding frequency during roll-to-roll process | 0 | 0 | 40 | 40 |
| Defective rate(%) | 0 | 0 | 40 | 40 |

As shown in Table 1, according to the ultrathin transferring and processing method according to the present invention, even if the ultrathin bending occurs, the bending is improved by coating or mounting an electrostatic inducing material at both ends of the roll so that the folding does not occur, which can improve the efficiency of the process and allow production of good quality articles.

It will be understood by those skilled in the art that various changes in form and details may be made therein without departing from the spirit and scope of the invention as defined by the appended claims.

DESCRIPTION OF SYMBOLS

100: ultrathin
120: both ends
130: nonconductive tape
200: roll
220: charging part
300: charged body
410: feeding roll
420: guide roll
430: rolling roll
440: winding roll
500: electrode mixture coating device
600: nonconductive film attaching device
700: nonconductive film removing device

The invention claimed is:

1. A method of transferring and processing a ultrathin in a roll-to-roll process, comprising:
   coating or mounting an electrostatic inducing material on both ends of a roll, while leaving a center portion uncoated, to form a charging part;
   charging both ends of the ultrathin and the roll, while leaving center portions uncharged, to a positive or negative charge by rubbing the ultrathin and the roll during the ultrathin transferring and rolling process; and
   applying an electrostatic force to both ends of the ultrathin at the same time as or after the charging to thereby alleviate a bending phenomenon of the ultrathin.

2. The method of claim 1, wherein the ultrathin and the roll are charged with charges of different polarities.

3. The method of claim 1, wherein a width of the charging part is 5% to 25% of a total width of the roll.

4. The method of claim 1, wherein the ultrathin is one of a non-conductor allowing production of a fabric, including polyethylene, polypropylene, polyolefin, polyester, nylon, cotton, acrylic fiber, and polyurethane; or a conductor allowing production in a ultrathin form, including copper, aluminum, nickel, titanium, tungsten, iron, silver, gold and an alloy containing the materials.

5. The method of claim 1, wherein the ultrathin is an electrode current collector, film or sheet used in secondary batteries.

6. The method of claim 1, wherein when the ultrathin is a conductor, the charging further includes attaching a nonconductive tape including a nonconductive film and an adhesive applied thereto to a surface in contact with the charging part in the ultrathin.

7. The method of claim 6, wherein in the attached nonconductive tape, a thickness of the nonconductive film is 50 to 300 μm, and a width thereof corresponds to a width of the charging part.

8. The method of claim 1, wherein the electrostatic inducing material is one selected from the group consisting of ebonite, nylon, wool, rayon, silk, acetate, orlon cotton blend, pulp noji, rubber, terylene, vinylon, sarin, polyclone, caffeate, polyethylene, canecalone, celluloid, cellophane, vinyl chloride, and teflon.

9. The method of claim 1, wherein the electrostatic inducing material and a material of the ultrathin coated or mounted on the charging part are different.

10. The method of claim 6, wherein the nonconductive tape attached to the ultrathin and the electrostatic inducing material coated or mounted on the charging part are different from each other.

11. The method of claim 1, wherein when the electrostatic inducing material is coated on the charging part, a thickness of the electrostatic inducing material to be coated is 1 to 20 mm.

12. The method of claim 1, wherein a diameter of a portion in which the charging part is formed in the roll is formed to be smaller than a diameter of a portion in which the charging part is not formed, by a thickness of the portion to be coated.

13. The method of claim 1, wherein the applying of the electrostatic force comprises applying the electrostatic force in an opposite direction of a curvature by installing an object charged with an opposite polarity or a same polarity as that of the both ends, on one or both sides of the charged both ends of the ultrathin.

14. The method of claim 13, wherein the object is a separate charged body installed to be adjacent to the ultrathin in a state that both ends are spaced apart from the charged roll or ultrathin.

15. The method of claim 13, wherein one or more of the charged body is installed along a direction of movement of the ultrathin.

16. The method of claim 13, wherein the charged body is at least one of ferromagnetic or semi-ferromagnetic material containing iron or nickel.

17. A secondary battery having two or more of electrodes for secondary batteries manufactured according to claim 1, and having an electrode assembly built in a battery case, wherein the electrode assembly is wound with a separator which is manufactured according to claim 1 and is interposed between unit electrodes.

18. A method of transferring and processing a ultrathin in a roll-to-roll process, comprising:
   coating or mounting an electrostatic inducing material on both ends of a roll to form a charging part;
   charging both ends of the ultrathin and the roll to a positive or negative charge by rubbing the ultrathin and the roll during the ultrathin transferring and rolling process; and
   applying an electrostatic force to both ends of the ultrathin at the same time as or after the charging to thereby alleviate a bending phenomenon of the ultrathin, wherein when the ultrathin is a conductor, the charging further includes attaching a nonconductive tape including a nonconductive film and an adhesive applied thereto to a surface in contact with the charging part in the ultrathin.

\* \* \* \* \*